(12) United States Patent
Muiter et al.

(10) Patent No.: US 10,377,319 B2
(45) Date of Patent: Aug. 13, 2019

(54) HOLDER FOR MOBILE DEVICE

(71) Applicant: Ford Global Technologies, LLC, Dearborn, MI (US)

(72) Inventors: James Hadley Muiter, Plymouth, MI (US); Daniel A. Jammoul, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/724,300

(22) Filed: Oct. 4, 2017

(65) Prior Publication Data
US 2019/0100155 A1  Apr. 4, 2019

(51) Int. Cl.
| | | |
|---|---|---|
| *B60R 11/02* | (2006.01) | |
| *H02J 7/00* | (2006.01) | |
| *H04M 1/04* | (2006.01) | |
| *B60R 11/00* | (2006.01) | |

(52) U.S. Cl.
CPC .......... *B60R 11/0241* (2013.01); *B60R 11/02* (2013.01); *H02J 7/0044* (2013.01); *H04M 1/04* (2013.01); *B60R 2011/0007* (2013.01); *B60R 2011/0047* (2013.01); *B60R 2011/0071* (2013.01); *B60R 2011/0075* (2013.01)

(58) Field of Classification Search
CPC ......... B60R 11/0241; B60R 2011/0007; B60R 2011/0071; B60R 2011/0047; B60R 2011/0075; H04M 1/04; H02J 7/0044

USPC .......................................................... 320/114
See application file for complete search history.

(56) References Cited

U.S. PATENT DOCUMENTS

| | | | | |
|---|---|---|---|---|
| 4,403,436 | A * | 9/1983 | Jennie | F41A 19/21 42/42.01 |
| 5,996,866 | A * | 12/1999 | Susko | B60R 11/0241 224/281 |
| 6,438,229 | B1 | 8/2002 | Overy et al. | |
| 7,410,269 | B2 * | 8/2008 | Harrity | H05B 37/0272 362/101 |
| 2004/0056779 | A1 * | 3/2004 | Rast | B63B 22/16 340/985 |
| 2015/0194829 | A1 * | 7/2015 | Smeja | H02J 7/0042 320/107 |
| 2016/0204816 | A1 * | 7/2016 | Abramovich | H04B 1/3888 455/575.8 |
| 2018/0069413 | A1 * | 3/2018 | Chen | H01R 13/7172 |

FOREIGN PATENT DOCUMENTS

DE   102014106947 A1   11/2015

* cited by examiner

*Primary Examiner* — M Baye Diao
(74) *Attorney, Agent, or Firm* — Vichit Chea; Price Heneveld LLP

(57) ABSTRACT

A charging assembly for a mobile device in a vehicle includes a slot positioned in a vehicle console wherein the slot comprises a floating floor having at least one connector. The charging assembly further includes a spring positioned between the floating floor and a bottom surface of the charging assembly. The floating floor retracts into the vehicle console to both support and charge the mobile device.

17 Claims, 13 Drawing Sheets

HOLDER FOR MOBILE DEVICE

FIELD OF THE INVENTION

The present invention generally relates to a charging assembly for a mobile device in a vehicle and, more specifically, to a charging assembly having a slot that can both charge and protect the phone during travel.

BACKGROUND OF THE INVENTION

Vehicle passengers frequently need a convenient place to both store and charge their smart phones and other mobile devices. Although many automotive designs offer limited storage places, including one-handed blind storage options, there is still the need in automobiles to provide options for phones to be simply stored, readily accessible, quickly charged, and easily seen when it is time to leave the vehicle. Storage and charging options for phones in a vehicle are made more complicated by the need for various sizes and form factors, including their cases, for all the varieties of mobile electronic devices. Additional complications are introduced when considering the wide variety of charging options for mobile devices. For example, there exists numerous different types of charging connections such as USB plugs, micro-USB plugs, USB-C plugs, and Lightning plugs that can be used to accommodate the various mobile devices. In addition, some mobile devices have the option to be recharged wirelessly using inductive charging.

The ability to provide drivers and passengers of vehicles the options they need to both protect and charge their mobile devices is in high demand for automobile manufacturers.

SUMMARY OF THE INVENTION

According to one aspect of the present invention, a charging assembly for a mobile device in a vehicle is provided. The charging assembly includes a slot positioned in a console wherein the slot comprises a floating floor having at least one connector and a spring positioned between the floating floor and a bottom surface of the charging assembly. The floating floor can be positioned into the slot to support and charge the mobile device.

Embodiments of the first aspect of the invention can include any one or a combination of the following features:
  a release latch coupled to the floating floor to control positioning of the floating floor;
  the release latch is a push-pull release latch;
  the release latch is selected from the group consisting of a lever, a switch, a pull tab, a button, a handle, a cable, and an activator;
  the at least one connector comprises a first connector, a second connector, and a third connector;
  the at least one connector is coupled to a daisy wheel;
  the at least one connector is coupled to a selector barrel;
  at least one sidewall finger to accommodate mobile devices having a plurality of different sizes;
  a 3-headed cable wherein a first head is coupled to a Micro-USB connector, a second head is coupled to a USB-C connector, and a third head is coupled to a Lightning connector;
  the slot is oriented in a vertical orientation, a horizontal orientation, or an angled orientation;
  a first locking means for maintaining the floating floor at a top position; and a second locking means for maintaining the floating floor at a lowered position.

According to another aspect of the present invention, a method for charging a mobile device in a vehicle is provided. The method includes selecting a connector that matches a charging port on the mobile device using an adjustable charging plug, positioning the mobile device in a slot comprising a floating floor wherein the mobile device is coupled to a connector, pushing the mobile device into the slot so the floating floor is in a retracted position, and charging the mobile device.

Embodiments of the second aspect of the invention can include any one or a combination of the following features:
  the adjustable charging plug comprises a first connector, a second connector, and a third connector;
  the adjustable charging plug comprises a daisy wheel or a selector barrel.
  locking the floating floor at a top position using a release latch to position the mobile device; and locking the floating floor at a lowered position using the release latch to hold and charge the mobile device; and
  positioning the mobile device in the slot using at least one sidewall finger to accommodate mobile devices having a plurality of different sizes.

According to another aspect of the present invention, a vehicle charging assembly is provided. The vehicle charging assembly includes a slot positioned in a vehicle surface wherein the slot comprises a floating floor and a recoil system positioned between the floating floor and a bottom surface of the charging assembly. The floating floor can be positioned into the slot to form a charging cavity to support and charge a mobile device.

Embodiments of the third aspect of the invention can include any one or a combination of the following features:
  a release latch coupled to the floating floor to control positioning of the floating floor;
  a first locking means for maintaining the floating floor at a top position; and a second locking means for maintaining the floating floor at a lowered position;
  the floating floor comprises at least one connector or wherein the charging cavity comprises a means for wireless charging.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
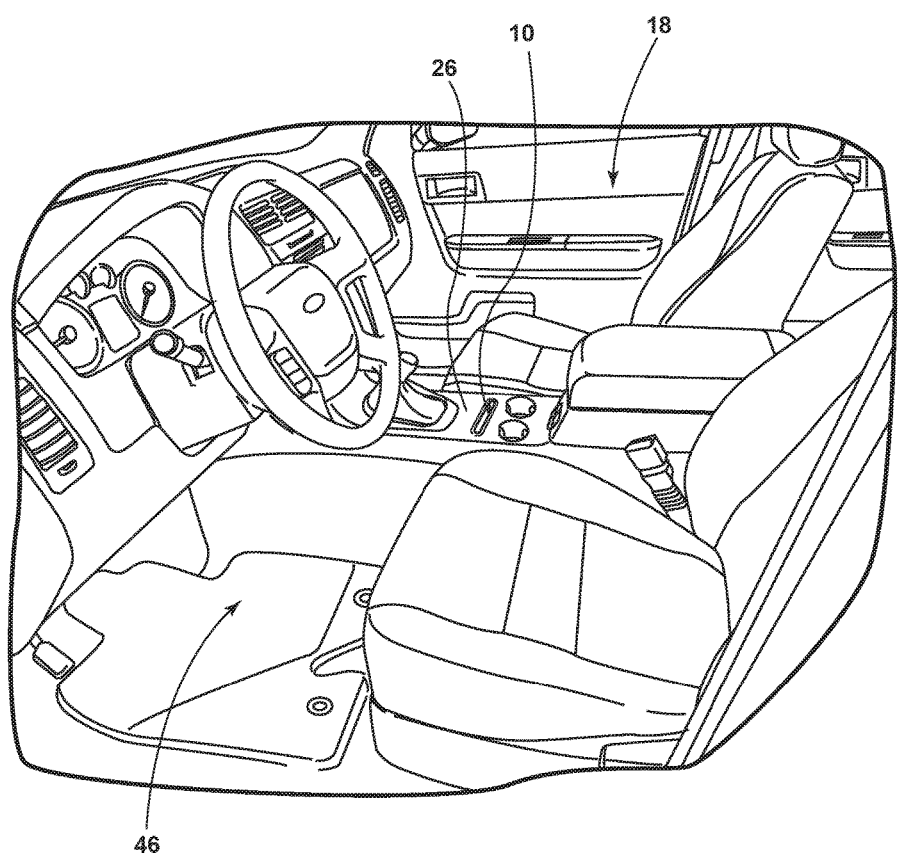
FIG. 1 shows a mobile device charging assembly mounted to a vehicle center console according to one aspect of the present invention.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-7, reference numeral 10 generally designates a charging assembly for a mobile device 14 in a vehicle 18. The charging assembly 10 includes a slot 22 positioned in a console 26 wherein the slot 22 comprises a floating floor 30 having at least one connector 34. The charging assembly 10 further includes a spring 38 positioned between the floating floor 30 and a bottom surface 42 of the charging assembly 10. The floating floor 30 can be positioned or retracted into the slot 22 of the console 26 to both support and charge the mobile device 14.

Referring now to FIG. 1, the charging assembly 10 is generally intended for use inside a passenger compartment 46 of the vehicle 18 and is exemplarily shown located in the vehicle center console 26. However, it should be appreciated that the charging assembly 10 may be located in the other areas of the vehicle 18 that are viewable and accessible to a vehicle passenger. The vehicle 14 is shown as a car although the type of vehicle 14 is not meant to be limiting and the vehicle 14 could additionally be, for example, a minivan, truck, commercial vehicle, or any other wheeled motorized vehicle.

Figure 2A:
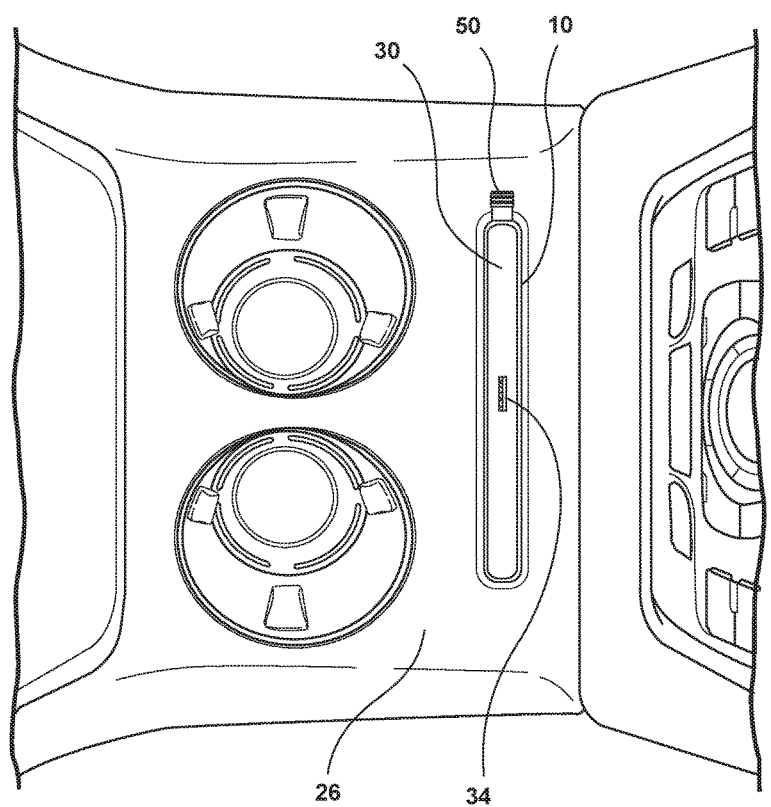
FIG. 2A is a top perspective view of the mobile device charging assembly positioned within a center console according to one aspect of the present disclosure.
Figure 2B:
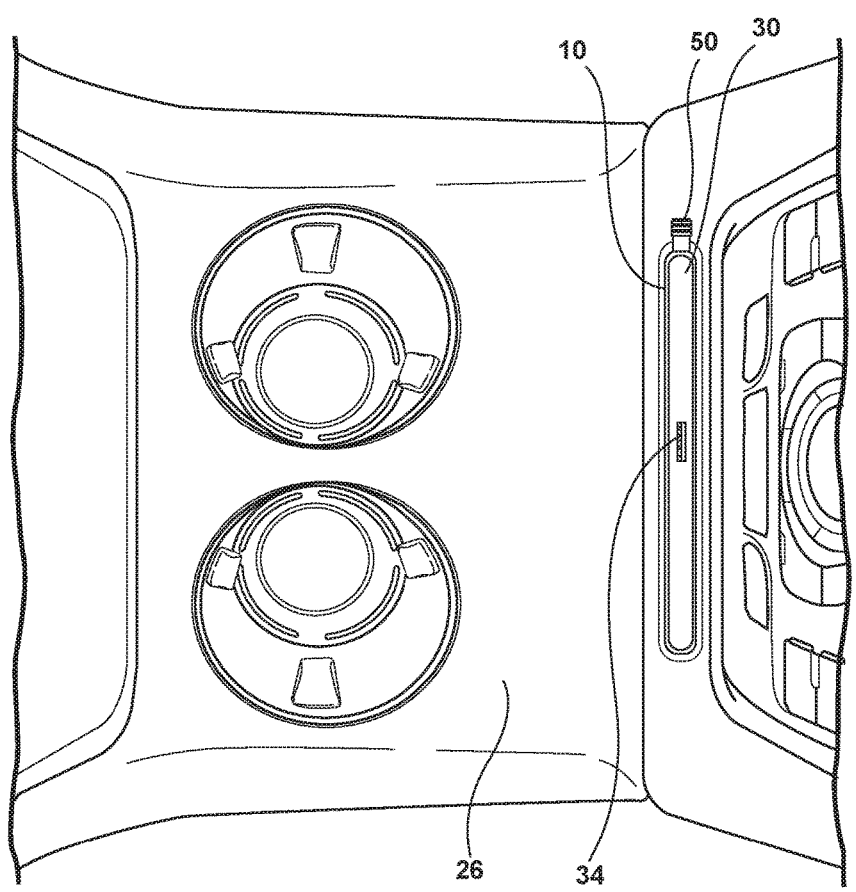
FIG. 2B is a top perspective view of the mobile device charging assembly positioned in a front dash of the center console according to one aspect of the present disclosure.

With reference to FIGS. 2A-2B, the charging assembly 10 is shown positioned in the console 26 with the slot 22 positioned perpendicular to the respective passenger and driver seating areas. The floating floor 30 having the connector 34 is positioned in the slot 22 where the depth of the floating floor 30 in the slot 22 is controlled by the push-pull release latch 50 positioned adjacent the charging assembly 10. The positioning of the charging assembly 10 can be varied depending on the design and accessibility of the vehicle 18 and one skilled in the art would appreciate that the charging assembly 10 could be positioned up on the instrument panel as shown in FIG. 2B or elsewhere in the vehicle 18. Depending on the design of the vehicle 18, the charging assembly 10 may be paired or installed with one or more additional charging assemblies 10 and the charging assembly 10 may be positioned in other locations of the vehicle 18, for example, center dashes, doors, rear console areas, control panels, and other walls or surfaces in the vehicle 18 or its corresponding seating.

Figure 3A:
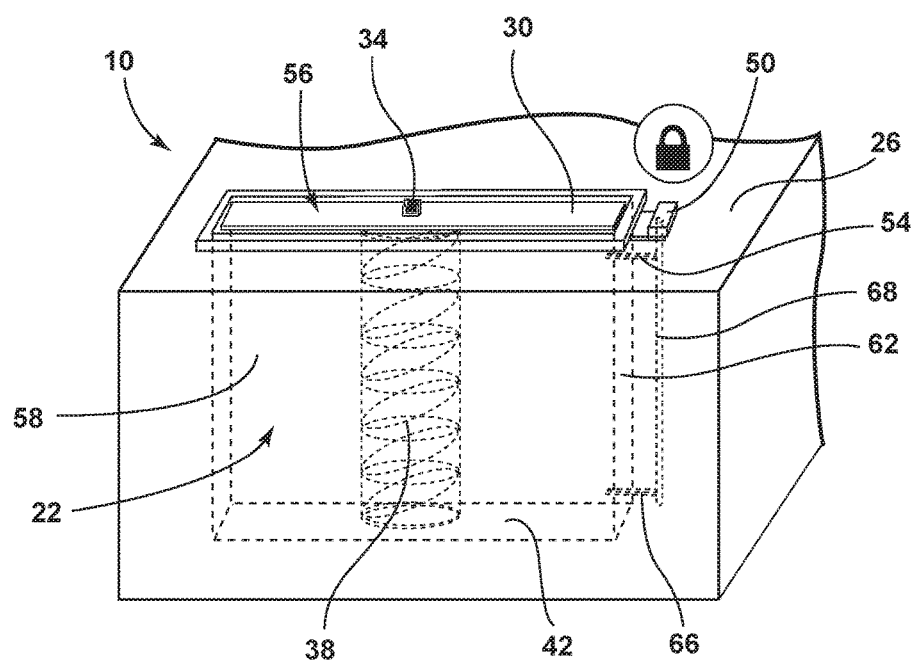
FIG. 3A is a partially schematic cross-sectional view of a portion of the mobile device charging assembly according to one aspect of the present disclosure.
Figure 3B:
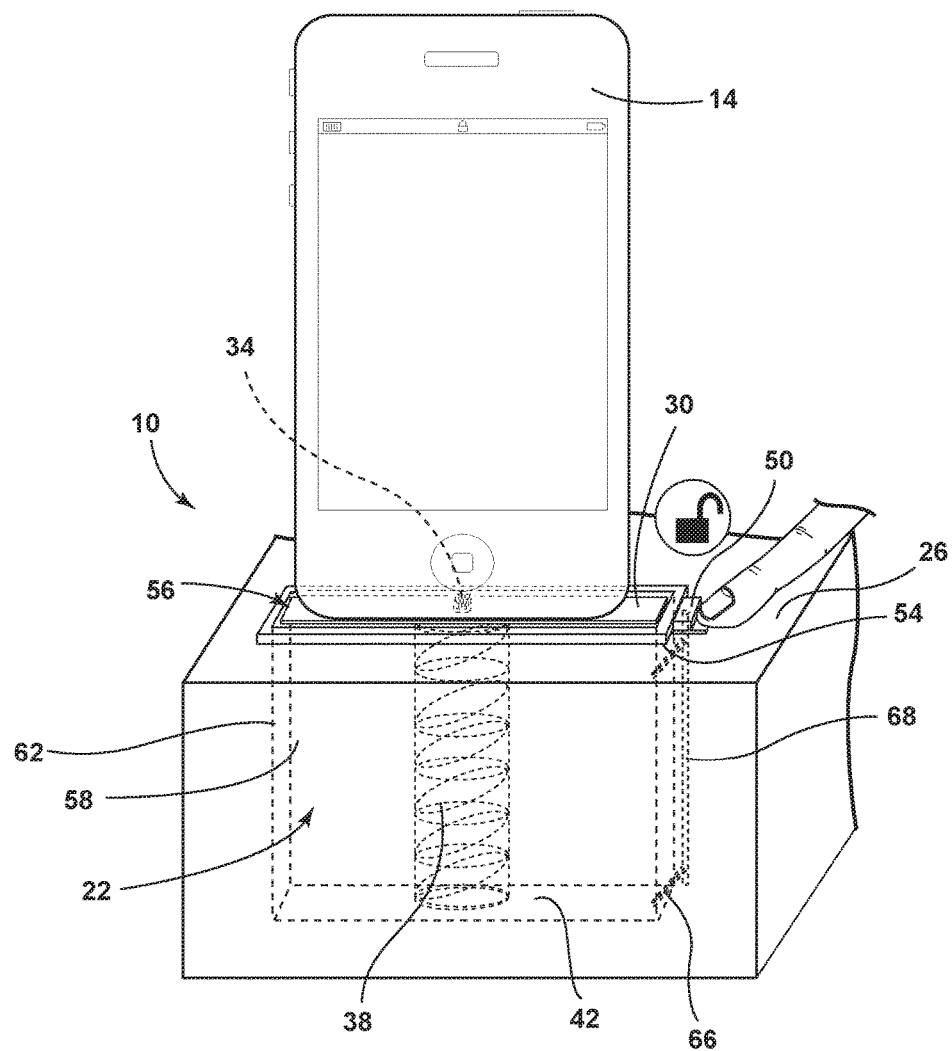
FIG. 3B is a partially schematic cross-sectional view of a portion of the mobile device charging assembly coupled to a mobile device according to one aspect of the present disclosure.
Figure 3C:
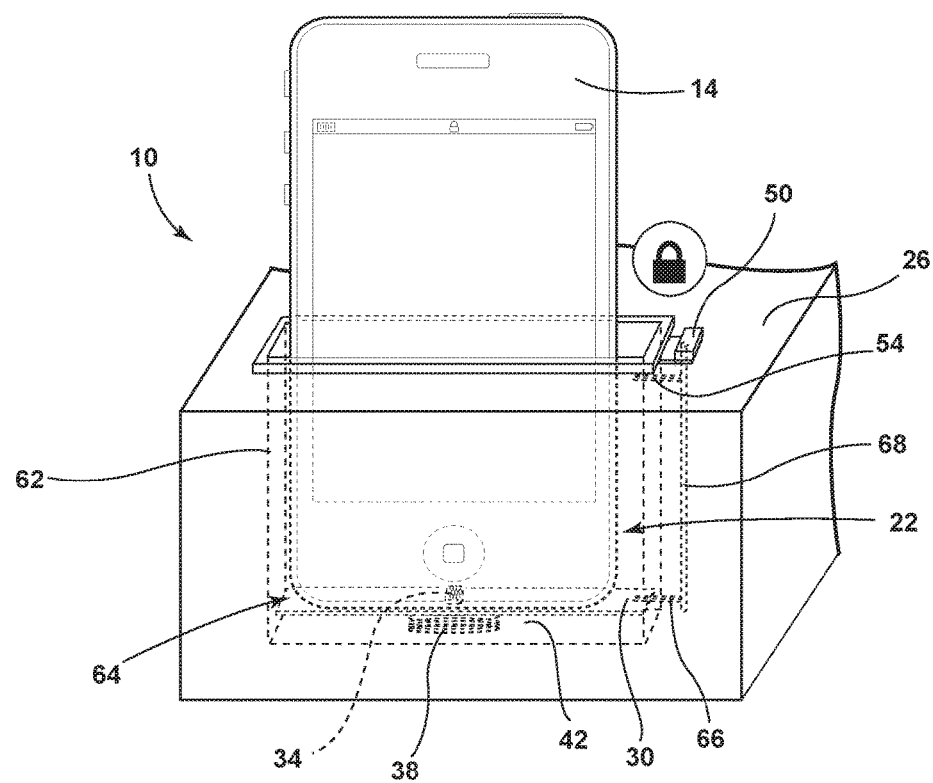
FIG. 3C is a partially schematic cross-sectional view of a portion of the charging assembly having the mobile device inserted in the slot according to one aspect of the present disclosure.

Referring to FIGS. 3A-3C, a partially schematic cross-sectional view of the charging assembly 10 in the console 26 is provided. The charging assembly 10 is shown having the slot 22 positioned down into the console 26. The floating floor 30 is a moveable surface that can support the mobile device 14 and/or move up and down the slot 22 to conceal the mobile device 14. The floating floor 30 may have one or more connectors 34 positioned at the surface of the floating floor 30 that can plug in or couple the mobile device 14 for charging applications. The push-pull release latch 50 controls a first lock 54 and a second lock 66 with a connecting arm or wire 68 where the first lock 54 can maintain the floating floor 30 at a top position 56 and the second lock 66 can maintain the floating floor 30 at a bottom position 64. The slot 22 is a cavity or area that is defined by opposing first sidewalls 58 and opposing second sidewalls 62. The spring 38 can be coupled to the floating floor 30 and the bottom surface 42 to provide tension and recoil for the floating floor 30 to be moved up and down the slot 22 of the charging assembly.

Referring now to FIG. 3A, the floating floor 30 is located at the top position 56 where the user can easily access and position the mobile device 14 (FIG. 3B) on the connector 34. The push-pull release latch 50 is shown in a locked position so it can maintain the floating floor 30 in the top position 56 as the user docks the mobile device 14 without the floating floor 30 moving down into the slot 22. The spring 38 is shown in a fully extended position between the floating floor 30 and the bottom surface 42 when the floating floor 30 is located at the top position 56.

Referring now to FIG. 3B, once the mobile device 14 is docked or coupled to the connector 34 positioned on the floating floor 30, the user may initiate the push-pull release latch 50 by pushing in on the release latch 50 to release the first lock 54 so that the floating floor 30 may be pushed down into the slot 22. As the push-pull release latch 50 is pushed in to release the first and second locks 54, 66, the charging assembly 10 is in a unlocked state where the floating floor 30 may be pushed down to a plurality of different depths or positions to store and visualize the mobile device 14. The spring 38 positioned and coupled between the floating floor 30 and bottom surface 42 maintains pressure on the floating floor 30 as it is pressed down into the slot 22 of the console 26.

Referring now to FIG. 3C, the mobile device 14 is shown in the bottom position 64 where the push-pull latch 50 is released and returns to its initial extended position relocking the first and second locks 54, 66. As the second lock 66 extends out into the slot 22 to contact the floating floor 30, the floating floor 30 is locked or maintained in the bottom position 64 along the bottom surface 42 of the slot 22 in the charging assembly 10. The spring 38 is shown in a fully contracted or compressed position between the floating floor 30 and the bottom surface 42 when the floating floor 30 is located at the bottom position 64.

The push-pull release latch 50 may be substituted with a variety of different types of release latches or interfaces. For example, the release latch may include the push-pull release latch 50 (FIGS. 3A-3C), a trigger release latch 78 (FIGS. 5A-5C), a push-push latch, a lever, a switch, a pull tab, a button, a handle, a cable, an activator, or a combination thereof. In some aspects, the push-pull release latch 50 may be positioned proximate or adjacent to the floating floor 30 of the slot 22. In other aspects, the release latch 50 may be positioned on a control panel or dash of the vehicle 18. The release latch 50 may include a mechanical means of locking the floating floor 30 while in other aspects may include an electronic means of locking the floating floor 30.

Figure 4:
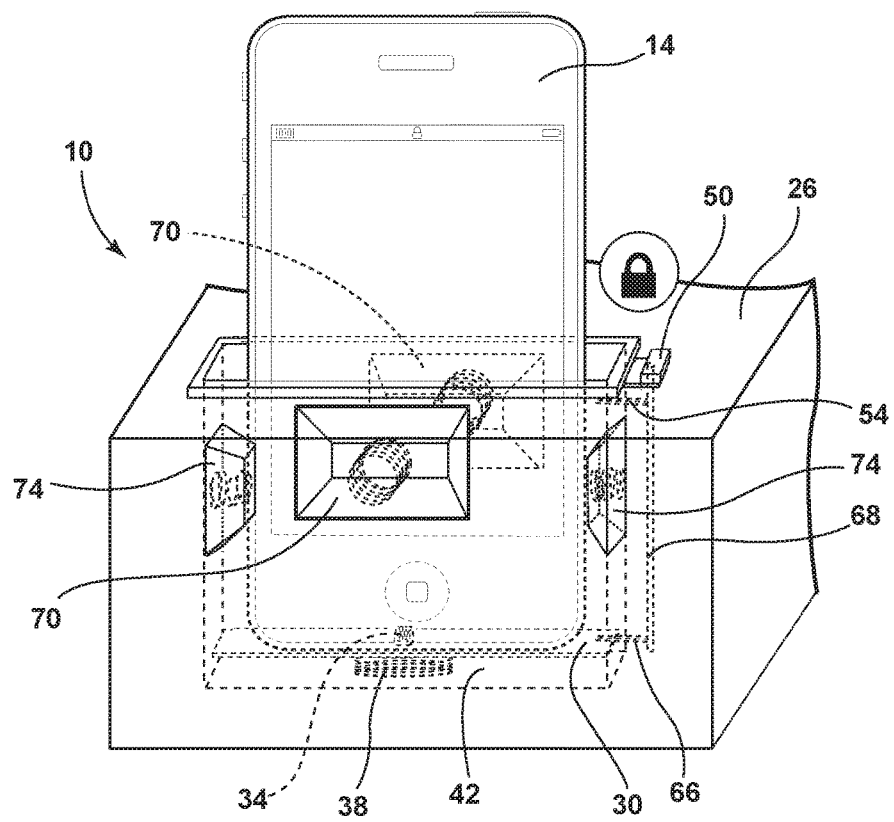
FIG. 4 is a partially schematic cross-sectional view of the charging assembly having spring-loaded sidewalls positioned in the slot according to one aspect of the present disclosure.

The slot 22, as mentioned above, is a cavity or area enclosed by the console 26 or other region in the vehicle 18. The slot 22 is defined by opposing first sidewalls 58, opposing second sidewalls 62, and the bottom surface 42. The slot 22 additionally includes at least one open side where the mobile device 14 is docked or inserted onto the connector 34 and/or floating floor 30. The floating floor 30 is designed to move up and down the length of the slot 22 to conceal, charge, immobilize, and/or protect the mobile device 14. In some aspects, the slot 22 can be long or deep enough to completely conceal the mobile device 14 when the floating floor 30 is in the bottom position 64. In other aspects, the slot 22 can be long or deep enough to only partially conceal the mobile device 14, as shown in FIGS. 3C, 4, and 5C, when the floating floor 30 is in the bottom position 64.

The floating floor 30 has an area less than the cross-sectional area of the slot 22 opening. The floating floor 30 may be coupled to one or more connectors 34 that can be selected based on a charging port of the mobile device 14. In some aspects, when the floating floor 30 is in the top position 56, the floating floor 30 may be even and/or flush with the surface of the console 26. The transition from the surface of the console 26 to the floating floor 30 of the charging assembly 10 may be even so no breaks in the console 26 may be apparent. The movement of the floating floor 30 back and forth in the slot 22 mimics the action of a toaster oven where bread is inserted into slots to toast the bread.

The first and second lock 54, 66 of the charging assembly 10 may include a variety of different embodiments. Depending on the type of locking mechanism selected, the number of different locked positions for the floating floor 30 may be varied. In addition, depending on the locking mechanism, the connecting arm 68 or an equivalent thereof may or may not be required to couple the one or more locks. In some aspects, the first and second lock 54, 66 may include an arm or a latch that is spring loaded to switch between a locked and an unlocked position. This arm or latch may contact the floating floor 30 on a top, side, or bottom surface to prevent the floating floor 30 from additionally moving up or down the slot 22. In other aspects, the first and second locks 54, 66 may include the opposing first sidewalls 58 and/or the opposing second sidewalls 62 where the opposing first and/or second sidewalls 58, 62 may contract and expand to pinch in on the floating floor 30. In still other aspects, the first and second locks 54, 66 may include a rack and pinion where the floating floor 30 may have a pinion gear that is coupled to a pinion rod where the floating floor 30 can be ratcheted up and down the slot 22 of the charging assembly 10. Other locking mechanisms known to those skilled in the art may be apparent or readily substituted with the charging assembly 10 described herein.

The spring 38 is not meant to be limiting and may include any type of recoil system known in the art that could be used to provide tension to the floating floor 30 as it is moved up and down the slot 22. The recoil system would be strong enough to return the floating floor 30 and docked mobile device 14 to the top position 56 when desired. In some aspects, a plurality of springs may be positioned between the floating floor 30 and the bottom surface 42.

Referring to now FIG. 4, the mobile device 14 is shown in a lowered position where one or more first sidewall fingers 70 and/or one or more second sidewall fingers 74 may be used to help position the mobile device 14 in the slot 22. In the lowered position, the spring 38 is compressed while the floating floor 30 is positioned near the bottom surface 42 where the floating floor 30 is maintained in the lowered position with the second lock 66. The one or more first sidewall fingers 70 may be positioned or coupled on the opposing first sidewalls 58 and the second sidewall fingers 74 may be positioned on the opposing second sidewalls 62. The first and second sidewall fingers 70, 74 may be coupled to the respective sidewalls 58, 62 using an alternative spring or other spring means for positioning the mobile device 14 into the slot 22.

Figure 5A:
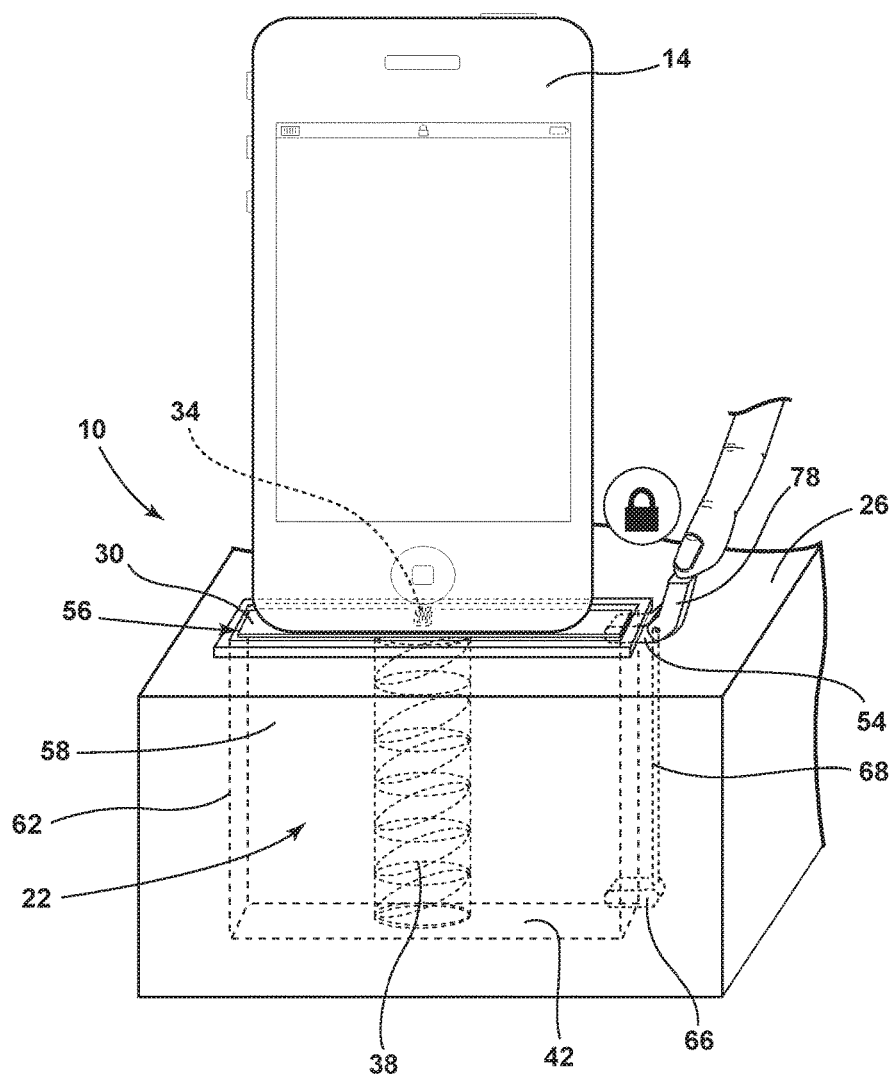
FIG. 5A is a partially schematic cross-sectional view of the charging assembly using a release latch to lock the floating floor according to one aspect of the present disclosure.
Figure 5B:
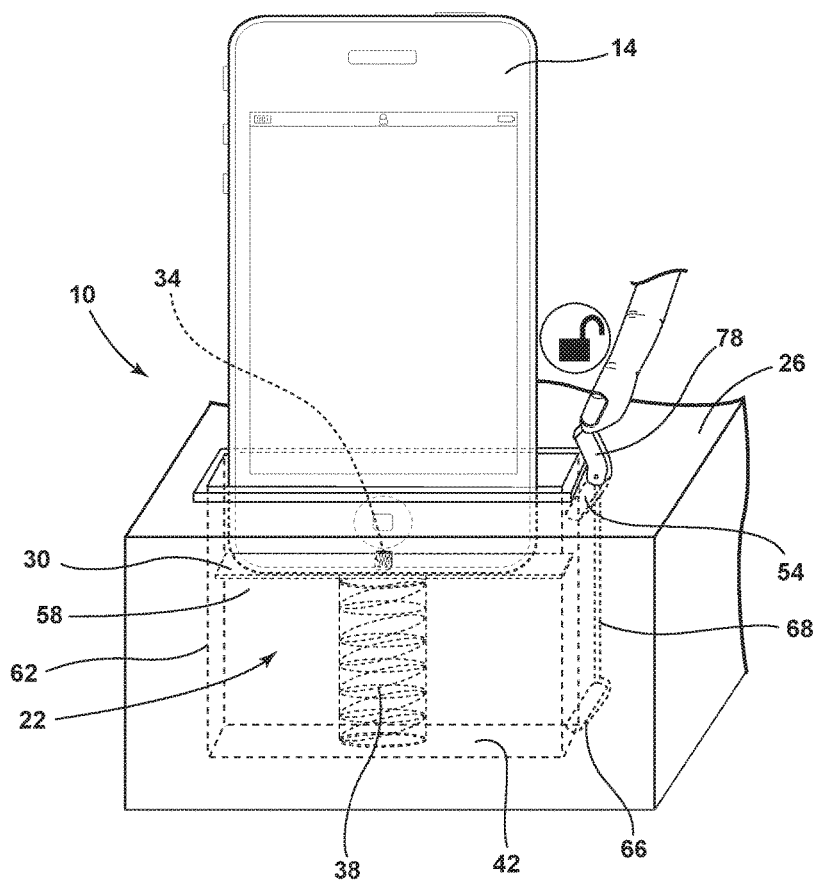
FIG. 5B is a partially schematic cross-sectional view of the charging assembly with the release latch engaged and the floating floor retracting into the slot according to one aspect of the present disclosure.
Figure 5C:
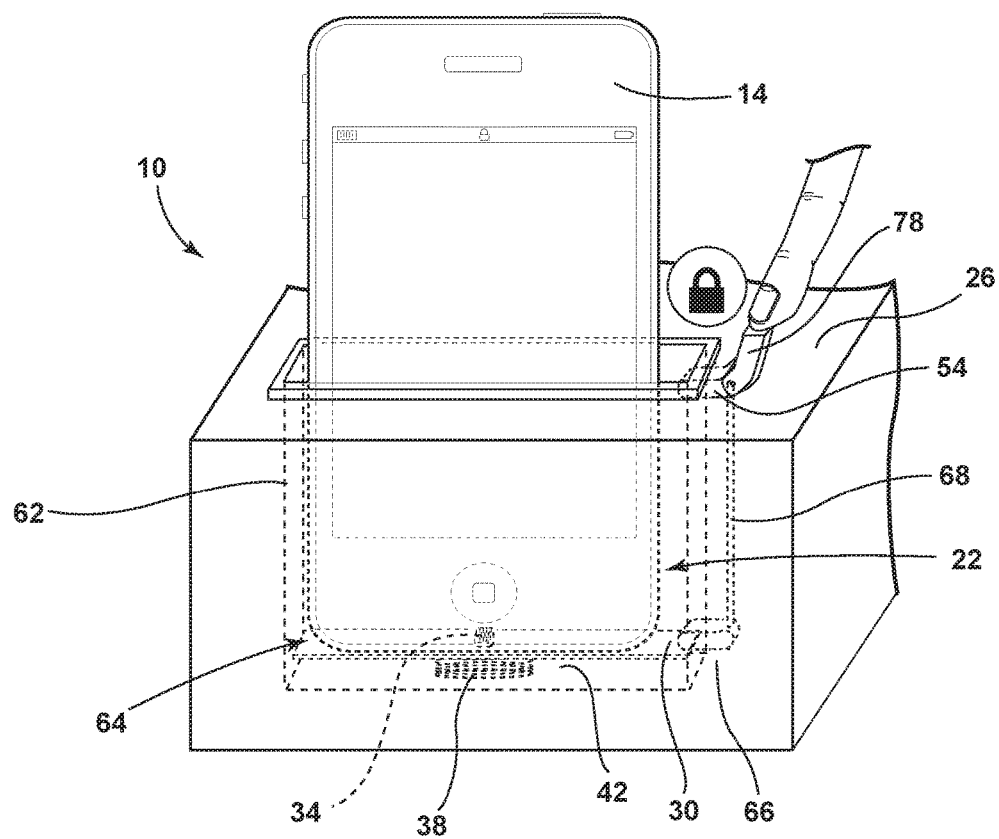
FIG. 5C is a partially schematic cross-sectional view of the charging assembly with the floating floor retracting into the slot according to one aspect of the present disclosure.

Referring now to FIGS. 5A-5C, an alternative embodiment for the push-pull release latch 50 is shown as the trigger release latch 78. In these embodiments, the user may first dock the mobile device 14 onto the connector 34 while the floating floor 30 is in the locked top position 56 as shown in FIG. 5A. The user may then apply pressure to the trigger release latch 78 to release the first and second locks 54, 66 so the floating floor 30 may be pushed down into the slot 22 formed by the opposing first sidewalls 58 and opposing second sidewalls 62 as shown in FIG. 5B. The spring 38 positioned between the floating floor 30 and the bottom surface 42 provides tension to the floating floor 30. Once the floating floor 30 is pushed down to the bottom surface 42 of the charging assembly 10, as shown in FIG. 5C, the trigger release latch 78 may be returned to the locked position so the second lock 66 maintains the floating floor 30 in the bottom position 64. In some aspects, a plurality of locks may be applied to the charging assembly 10 so the floating floor 30 can be positioned at a plurality of different heights throughout the slot 22.

Figure 6A:
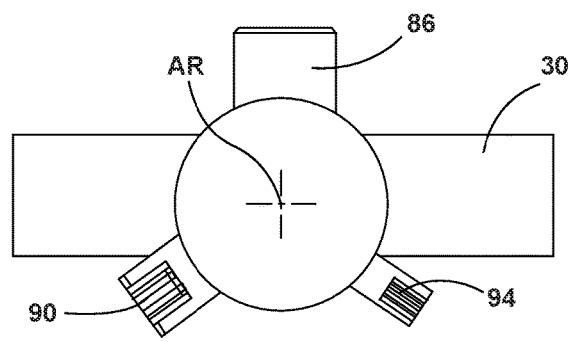
FIG. 6A is a perspective view of a daisy wheel having a plurality of connectors according to one aspect of the present disclosure.
Figure 6B:
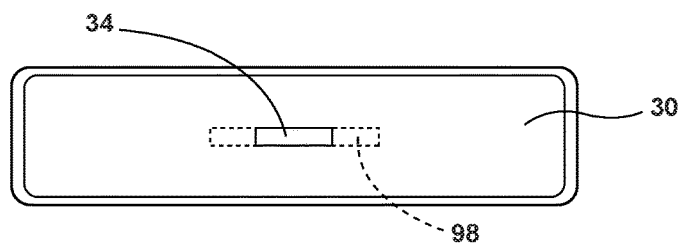
FIG. 6B is a top view of a daisy wheel having a plurality of connectors positioned in the floating floor according to one aspect of the present disclosure.

Referring now to FIGS. 6A-6B, a daisy wheel 82 is shown positioned in the floating floor 30 so one or more connectors 34 may be readily accessed to dock with the mobile device 14 by rotating the daisy wheel 82 along an axis of rotation AR. In some aspects, the daisy wheel 82 is rotated manually by the user's finger to select the desired connector 34. The one or more connectors 34 may include a first connector 86, a second connector 90, or a third connector 94. The charging assembly 10 may further include a 3-headed cable (shown in FIG. 7C) having a first head coupled to the first connector 86, a second head coupled to the second connector 90, and a third head coupled to the third connector 94. In some aspects, the first connector 86 may be a Micro USB connector, the second connector 90 may be a USB-C connector, and the third connector 94 may be a Lighting connector. As shown in FIG. 6B, an open rotation space 98 is positioned in the floating floor 30 so that the daisy wheel 82 may be rotated so one of the first, second, or third connectors 86, 90, 94 may be selected to dock with the mobile device 14. The open rotation space 98 has dimensions large enough so that each of the first, second, or third connector 86, 90, 94 can rotate through the open space 98.

Figure 7A:
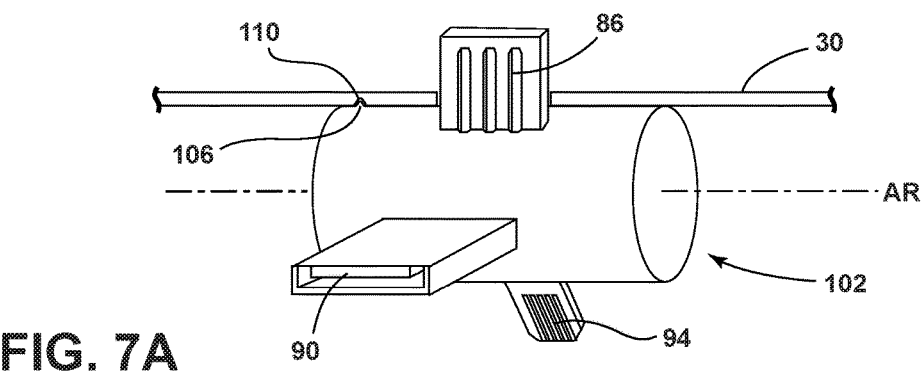
FIG. 7A is a perspective view of a barrel having a plurality of connectors according to one aspect of the present disclosure.
Figure 7B:
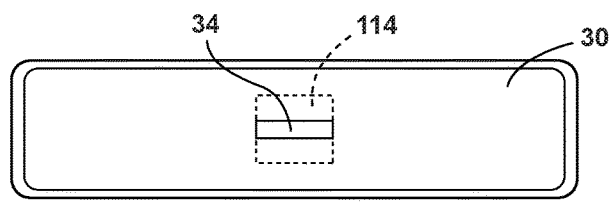
FIGS. 7B and 7C are a top view of a barrel having a plurality of connectors positioned in the floating floor according to one aspect of the present disclosure and a perspective view of a 3-headed cable having a plurality of connectors according to one embodiment.
Figure 7C:
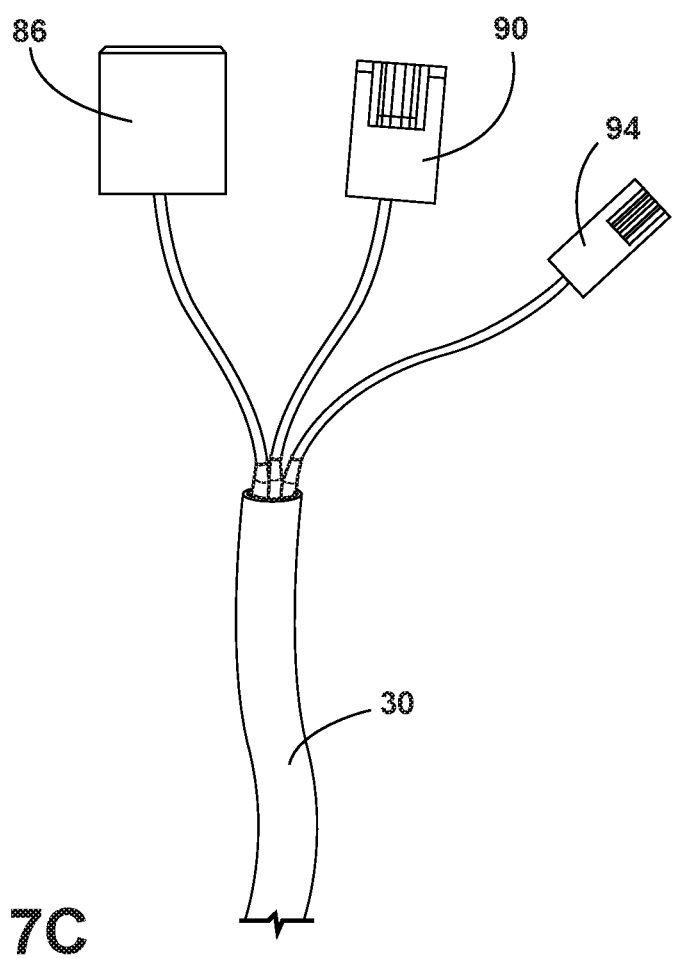

Referring now to FIGS. 7A-7B, a selector barrel 102 is shown having one or more connectors 34 where the selector barrel 102 is positioned directly beneath the floating floor 30 so a detent 106 can be positioned in a receiving groove 110. In some aspects, the selector barrel 102 includes one connector, two connectors, three connectors, four connectors, five connectors, or six connectors. In some aspects, the one or more connectors 34 may include the first connector 86, the second connector 90, or the third connector 94. The charging assembly 10 may further include the 3-headed cable (shown in FIG. 7C) having the first head coupled to the first connector 86, the second head coupled to the second connector 90, and the third head coupled to the third connector 94. In some aspects, the first connector 86 may be a Micro-USB connector, the second connector 90 may be a USB-C connector, and the third connector 94 may be a Lighting connector. In some aspects, one or more detents 106 may be used on the selector barrel 102 to help position that the first, second, or third connector 86, 90, 94. The selector barrel 102 may be rotated along the axis of rotation AR so that the first, second, or third connector 86, 90, 94 may be selected to dock with the mobile device 14. In some aspects, the selector barrel 102 is rotated manually by the user's finger to select the desired connector 34. FIG. 7B represents the floating floor 30 having an open barrel rotation space 114 so that the selector barrel 102 may be rotated to select the desired connector 34. The open barrel rotation space 114 has dimensions large enough so that each of the first, second, or third connector 86, 90, 94 can rotate through the open space 114.

Figure 8:
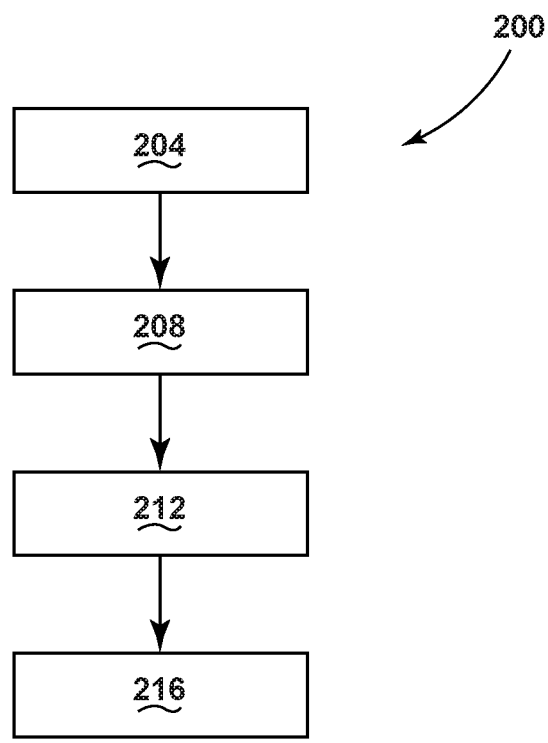
FIG. 8 is a flow diagram of a method for charging a mobile device in a vehicle according to some aspects of the present disclosure.

Referring now to FIG. 8, with continued reference to FIGS. 1-7B, a method 200 for charging the mobile device 14 in the vehicle 18 is shown. The method 200 may begin with a step 204 that includes selecting the connector 34 that matches a charging port on the mobile device 14 using an adjustable charging plug. The adjustable charging plug includes the daisy wheel 82 and/or the selector barrel 102 where both the daisy wheel 82 and the selector barrel 102 provide the first, second, or third connectors 86, 90, 94. In some aspects, the first connector 86 may be the Micro-USB connector, the second connector 90 may be the USB-C connector, and the third connector 94 may be the Lightning connector.

Next is a step 208 of positioning and/or docking the mobile device 14 onto the connector 34 of the floating floor 30. Positioning and/or docking the mobile device 14 can occur when the floating floor 30 is at the top position 56. An additional step of locking the floating floor 30 at the top position 56 using the push-pull or trigger release latch 50, 78 to couple and/or dock the mobile device 14 can be used.

Next is a step 212 of pushing the mobile device 14 into the slot 22 so the floating floor 30 is in a retracted position or the bottom position 64. In some aspects, the floating floor 30 may be set at a plurality of different heights to partially or completely insert the mobile device 14 into the slot 22 of the charging assembly 10. The floating floor 30 is positioned in the retracted or bottom position 64 by locking the floating floor 30 at a desired position by using the push-pull or trigger release latch 50, 78 to position and/or charge the mobile device 14.

Next is a step 216 of charging the mobile device 14. In some aspects, charging the mobile device 14 can be accomplished by using the one or more connectors 34. In other aspects, charging the mobile device 14 can be accomplished using inductive charging where no wires or connectors are required. In embodiments where inductive charging is used, the slot 22 becomes a charging cavity where principles and components known to those skilled are used to charge the mobile device 14.

It is understood that the descriptions outlining and teaching the charging assembly 10 previously discussed, which can be used in any combination, apply equally well to the method 200 for charging the mobile device 14 in the vehicle 18.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A charging assembly for a mobile device in a vehicle comprising:
    a slot positioned in a console wherein the slot comprises a floating floor having at least one connector;
    a spring positioned between the floating floor and a bottom surface of the charging assembly;
    a first lock for preventing downward movement of the floating floor for maintaining the floating floor at a top position; and
    a second lock for maintaining the floating floor at a lowered position;
    wherein the floating floor can be positioned into the slot to support and charge the mobile device.

2. The charging assembly of claim 1 further comprising:
    a release latch coupled to the floating floor to control positioning of the floating floor.

3. The charging assembly of claim 2, wherein the release latch is a push-pull release latch.

4. The charging assembly of claim 2, wherein the release latch is selected from the group consisting of a lever, a switch, a pull tab, a button, a handle, a cable, and an activator.

5. The charging assembly of claim 1, wherein the at least one connector comprises a first connector, a second connector, and a third connector.

6. The charging assembly of claim 1, wherein the at least one connector is coupled to a daisy wheel.

7. The charging assembly of claim 1, wherein the at least one connector is coupled to a selector barrel.

8. The charging assembly of claim 1 further comprising:
    at least one sidewall finger to accommodate mobile devices having a plurality of different sizes.

9. The charging assembly of claim 1 further comprising:
    a 3-headed cable wherein a first head is coupled to a Micro-USB connector, a second head is coupled to a USB-C connector, and a third head is coupled to a Lightning connector.

10. The charging assembly of claim 1, wherein the slot is oriented in a vertical orientation, a horizontal orientation, or an angled orientation.

11. A method for charging a mobile device in a vehicle, the method comprising:
    selecting a connector that matches a charging port on the mobile device using an adjustable charging plug wherein the adjustable charging plug comprises a daisy wheel or a selector barrel;
    positioning the mobile device in a slot comprising a floating floor wherein the mobile device is coupled to a connector;
    pushing the mobile device into the slot so the floating floor is in a retracted position; and
    charging the mobile device.

12. The method of claim 11, wherein the adjustable charging plug comprises a first connector, a second connector, and a third connector.

13. The method of claim 11 further comprising:
    locking the floating floor at a top position using a release latch to position the mobile device; and
    locking the floating floor at a lowered position using the release latch to hold and charge the mobile device.

14. The method of claim 11 further comprising:
    positioning the mobile device in the slot using at least one sidewall finger to accommodate mobile devices having a plurality of different sizes.

15. A vehicle charging assembly comprising:
    a slot positioned in a vehicle surface wherein the slot comprises a floating floor;
    a recoil system positioned between the floating floor and a bottom surface of the charging assembly; and
    at least one lock configured to selectively maintain the floating floor at a top position, a lowered position, and at least one intermediate position;
    wherein the floating floor can be positioned into the slot to form a charging cavity to support and charge a mobile device.

16. The vehicle mobile device charging assembly of claim 15 further comprising:
    a release latch coupled to the floating floor to control positioning of the floating floor.

17. The vehicle mobile device charging assembly of claim 15, wherein the floating floor comprises at least one connector or wherein the charging cavity comprises an assembly for wireless charging.

* * * * *